May 7, 1940.　　　G. R. HUFF　　　2,199,725
SELF-LUBRICATING STUFFING BOX FOR OIL WELLS
Filed March 16, 1939
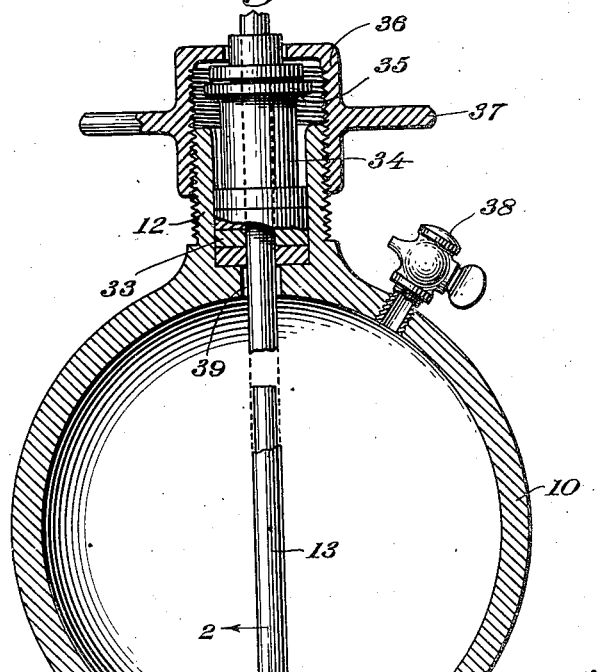
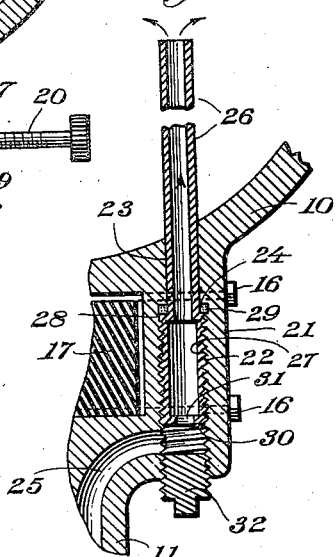
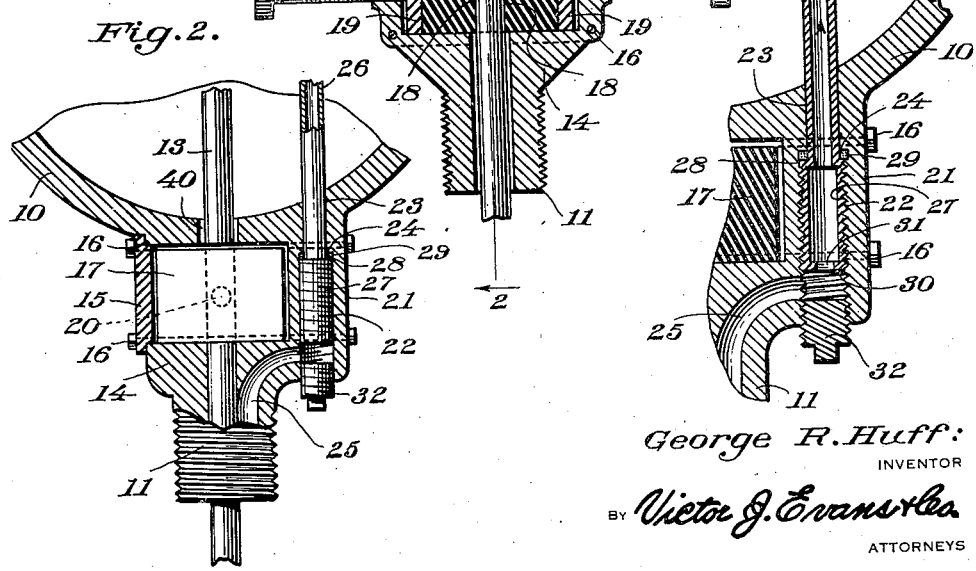
George R. Huff,
INVENTOR
BY Victor J. Evans & Co.
ATTORNEYS Patented May 7, 1940

2,199,725

UNITED STATES PATENT OFFICE 2,199,725

SELF-LUBRICATING STUFFING BOX FOR OIL WELLS

George R. Huff, Sasakwa, Okla.

Application March 16, 1939, Serial No. 262,325

2 Claims. (Cl. 286—27)

This invention relates to self-lubricating stuffing boxes for oil wells and has for an object to provide a device of this character having a bowl forming an oil reservoir which lubricates the rubber packing elements of the polish rod and prevents the packing elements burning out should the well be pumped dry and thus eliminates fire hazards.

A further object is to provide a device of this character which will be devoid of check valves and other complicated mechanism which might easily get out of order under several conditions of service.

A further object is to provide a device of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a longitudinal sectional view of a self-lubricating stuffing box for oil wells, constructed in accordance with the invention.

Figure 2 is a fragmentary cross sectional view of the stuffing box taken on the line 2—2 of Figure 1.

Figure 3 is an enlarged detail sectional view of the stuffing box showing the construction of the pipe which replenishes the oil supply in the bowl and prevents retrograde movement of oil from the bowl except to the rubber packing elements.

Referring now to the drawing in which like characters of reference designate similar parts in the various views, 10 designates a substantially globular hollow bowl provided at its lower end with an exteriorly threaded nipple 11 adapted to be secured in the well casing, and provided at its upper end with an exteriorly threaded nipple 12, through which nipples the polish rod 13 operates.

Integral with the bottom of the bowl and the lower nipple is a substantially rectangular box 14 having one side open and closed through the medium of a cover 15 which is secured in place by bolts 16.

The box is adapted to receive rubber packing blocks 17 which are substantially rectangular in cross section and are provided on their confronting faces with grooves 18 forming an opening of circular cross section to receive the polish rod. A pair of pressure plates 19 are disposed between two of the walls of the box and the faces of the blocks which confront these walls. Adjusting screws 20 are threaded through the walls of the box and bear against the pressure plates for urging the pressure plates to tightly engage the rubber packing blocks with the polish rod.

For lubricating the packing blocks with a portion of the oil which is raised from the well, the wall 21 of the box opposite the cover is thickened, as best shown in Figures 2 and 3, and is provided with a vertically disposed threaded opening 22 the upper end 23 of which is uniformly reduced to provide a shoulder 24, the upper end of the opening passing through the bottom of the bowl and communicating with the interior thereof. The lower end portion of the opening 22 communicates with an arcuate duct 25 which passes through the nipple 14 and communicates with the interior of the casing.

A pipe 26 is engaged through the opening 22 and reduced upper portion 23 thereof and extends upwardly into the bowl to a point near the top of the bowl. The pipe terminates short of the duct 25 and is provided with a uniformly enlarged exteriorly threaded lower portion 27 having a shoulder 28 between which shoulder and the shoulder 24 of the box a lead, copper or other packing washer 29 is confined to prevent leakage of oil through the opening 22 back into the casing. The lower end 27 of the pipe terminates short of the duct 25 so that oil from the casing may freely flow through the pipe to fill the bowl. The lower end of the pipe is provided with a bottom wall 30 having a kerf 31 formed therein which performs the dual function of a means to permit insertion of a tool to screw the pipe into the opening 22 and a passage through which oil may flow from the duct 25 into the pipe, as best shown in Figure 3.

The lower end of the opening 22 is closed by a plug 32. This plug permits the oil to be drained through the duct 25 when the plug is removed.

The upper nipple 12 receives packing rings 33 which are sleeved on the polish rod. These rings are compressed through the medium of a babbitt gland 34 which is provided with a flanged gland 35 at the top. The flange of the flanged gland is engaged by a cap 36 which is provided with interior threads to engage the exterior threads of the nipple. The cap is provided with handles 37 which permit the cap to be screwed on to the nipple to compress the babbitt gland. A pet cock 38 is mounted on the bowl 10 adjacent the top thereof. This pet cock may be used for filling and testing the amount of oil in the bowl.

In practice oil from the casing rises through the duct 25 and pipe 26 on to the bowl and fills the bowl, the oil then escaping through aligned openings 39 and 40 to the packing rings 33 and packing blocks 17 so that these elements are thoroughly lubricated at all times. Thus fire hazards due to burned up packings and other causes is positively eliminated.

What is claimed is:

1. A self-lubricating stuffing box for wells comprising a substantially globular hollow bowl adapted to contain liquid, an exteriorly threaded nipple disposed on the bottom of the bowl adapted to slidably receive a polish rod, a box connected to the nipple and the bottom of the bowl, packing blocks in the box provided with grooves forming an opening of circular cross section to receive the polish rod, a pair of pressure plates in the box engaging the packing blocks, adjusting screws threaded through the walls of the box and bearing against the pressure plates for urging the pressure plates to tightly engage the rubber packing blocks with the polish rod, one wall of the box being provided with a by-pass which is uniformly reduced to provide a shoulder, the upper end of the by-pass communicating with the interior of the bowl, the lower end of the by-pass passing through the nipple for receiving fluid from the well, a pipe engaged through the by-pass and extending upwardly into the bowl, the pipe being provided with a uniformly enlarged portion forming a shoulder, a packing washer confined between the shoulder of said by-pass and the shoulder of the pipe for preventing leakage from the bowl along said pipe, there being openings in said bowl communicating with said box to permit liquid from the bowl to lubricate said blocks.

2. A self-lubricating stuffing-box for wells including a bowl having an externally threaded nipple through which a pump polish rod is adapted to operate, a box between the bottom of the bowl and nipple, rubber blocks disposed in the box adapted to snugly engage the polish rod, there being a passage formed in one of the walls of the box communicating with the interior of the bowl, a pipe engaged in said passage and extending upwardly in the bowl to nearly the top of the bowl, there being a duct in said nipple and bottom of the box communicating with said passage and opening through the bottom of the nipple for supplying liquid from a well to the bowl through the pipe, a drain plug provided at the lower end of the passage, and a petcock mounted on the bowl for filling and testing the amount of liquid in the bowl, there being an opening formed in the bowl communicating with the packing box to permit liquid from the bowl to lubricate said packing and blocks.

GEORGE R. HUFF.